United States Patent [19]
Safiuddin

[11] 3,774,488
[45] Nov. 27, 1973

[54] SENSING SYSTEM FOR CUT-TO-LENGTH SHEAR

[75] Inventor: Mohammed Safiuddin, North Tonawanda, N.Y.

[73] Assignee: Westinghouse Electric Corporation, Pittsburgh, Pa.

[22] Filed: Dec. 21, 1971

[21] Appl. No.: 210,466

[52] U.S. Cl........................ 83/293, 83/296, 83/299
[51] Int. Cl............................................. B23d 25/16
[58] Field of Search ........................... 83/293–295, 285–289, 299, 296

[56] References Cited
UNITED STATES PATENTS

| | | | |
|---|---|---|---|
| 2,692,361 | 10/1954 | Asbury et al. | 83/289 X |
| 3,386,321 | 6/1968 | Maxwell | 83/295 |
| 3,543,624 | 12/1970 | Richards | 83/289 X |
| 2,298,877 | 10/1942 | Edwards et al. | 83/288 X |

FOREIGN PATENTS OR APPLICATIONS

| 624,398 | 7/1961 | Canada | 83/295 |
|---|---|---|---|

Primary Examiner—J. M. Meister
Attorney—F. H. Henson et al.

[57] ABSTRACT

A sensing system for cut-to-length shear, for providing a shear control signal for a process line of material moving at a line speed which is a function of a voltage $V_L$, the shear control signal being used for causing actuation of the shearing mechanism. A signal $V_B$ is derived which is a function of the predetermined cut length. A signal $V_i$ is derived which is a function of the instantaneous length of material passing the shearing mechanism. An additional voltage $\Delta V$ is derived is a function of ($V_L\ t_{inertia}/t$) where $t_{inertia}$ is the time required for the shearing mechanism to respond to the shear control signal, and $t$ is the running time required for a predetermined cut length to pass through the shearing mechanism at maximum line speed. The signals $V_B$, $Vi$ and $\Delta v$ are received by electronic circuitry, and a shear control signal is delivered to the shearing mechanism when the algebraic relationship is satisfied $V_B = Vi + \Delta V$.

3 Claims, 4 Drawing Figures

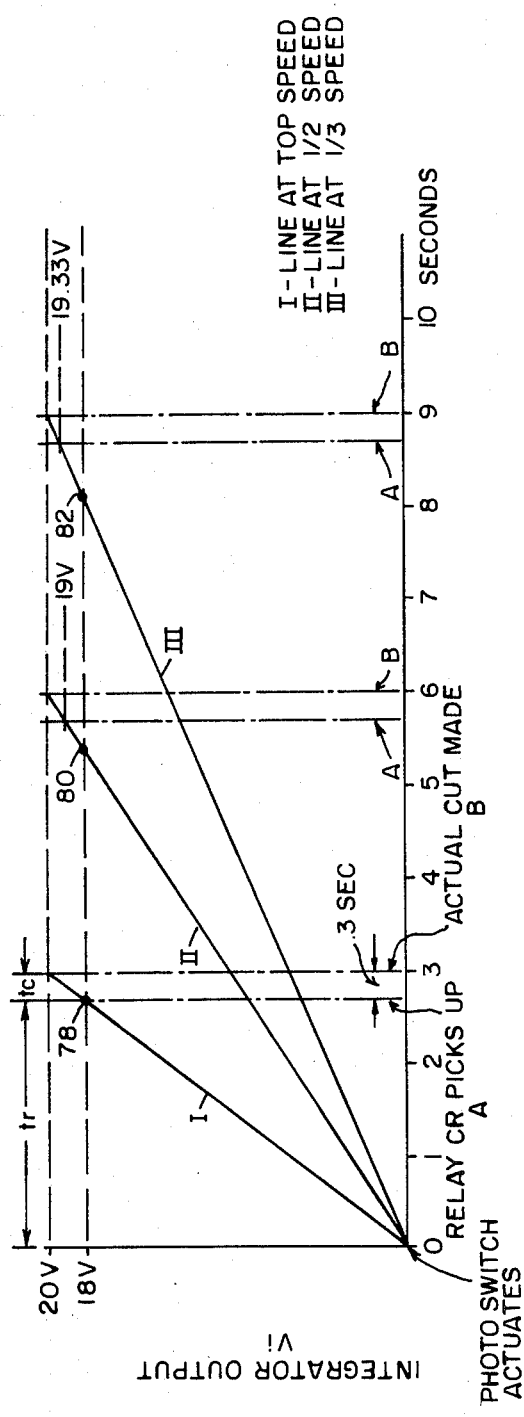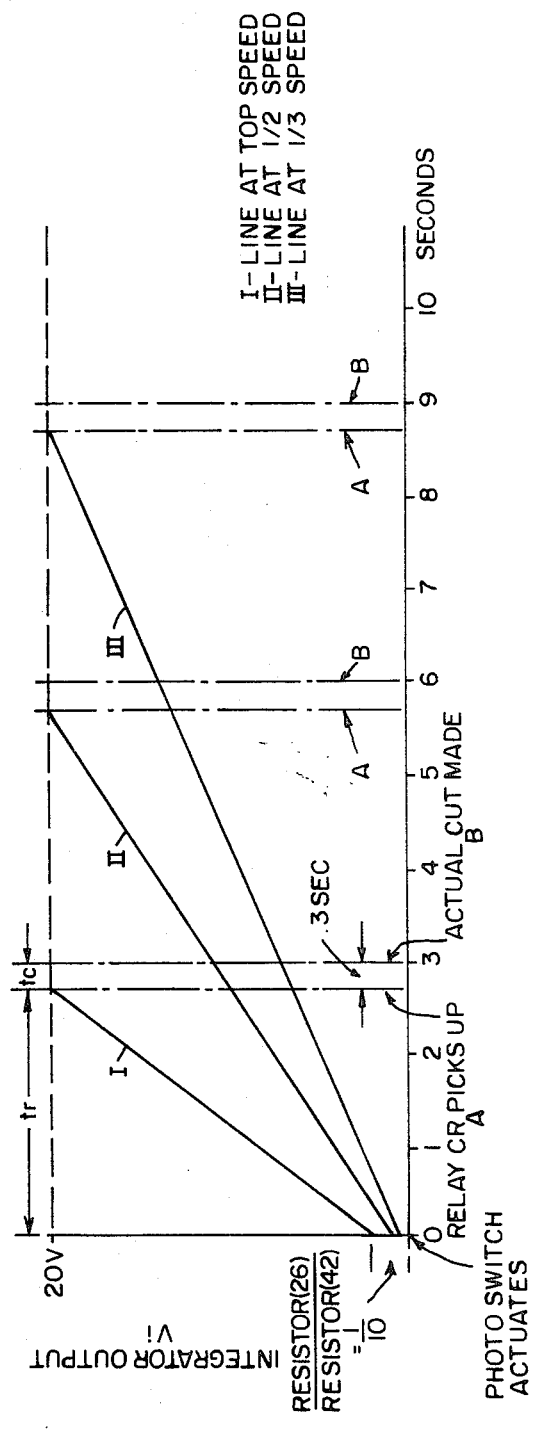

SENSING SYSTEM FOR CUT-TO-LENGTH SHEAR

CROSS REFERENCE TO RELATED APPLICATION

None.

BACKGROUND OF THE INVENTION

1. Field of the Invention

This invention relates to a sensing system for a cut-to-length shear of a moving strip of material.

2. Description of the Prior Art

In the high speed processing of materials, it is a requirement that the moving strip be measured and cut to the desired length without interrupting the moving process line, a signal being generated to actuate the shearing means at the required moment in time. At present these objectives are realized through the use of photoelectric detectors and sophisticated digital computers. The photoelectric devices, while inexpensive, suffer from the disadvantage that they do not provide the requisite accuracy for cutting lengths at varying line speeds. Digital computers of the high accuracy required are very expensive. The invention described herein accomplishes the dual objectives of high accuracy under varying line processing speeds, with a relatively inexpensive system.

SUMMARY OF THE INVENTION

A sensing system for providing a shear control signal for a process line of material moving at a line speed which is a function of a voltage $V_L$, the shear control signal actuating shear means for cutting predetermined lengths of material. Means are provided for deriving a voltage $V_B$ which is a function of said predetermined length. Means are provided for deriving a voltage Vi which is a function of the instantaneous length of material passing through the cutting shear means. Means are provided for deriving an additional voltage $\Delta v$ which is a function of $(V_L\, t_{inertia}/t)$ where $t_{inertia}$ is the time required for the cutting shear means to respond to said shear control signal, and $t$ is the running time required for said predetermined length to pass through said cutting shear means at maximum line speed. Means are arranged for receiving the signals $V_B$, Vi and $\Delta V$ as an input, and for delivering said shear control signal when the algebraic relationship is satisfied: $V_B = Vi + \Delta V$.

BRIEF DESCRIPTION OF THE DRAWINGS

FIGS. 3 and 4 are diagrams depicting integrator output vs. time for various line speeds, for use in explaining the operation of the embodiments of FIGS. 1 and 2.

DESCRIPTION OF THE EMBODIMENTS

Figure 1:
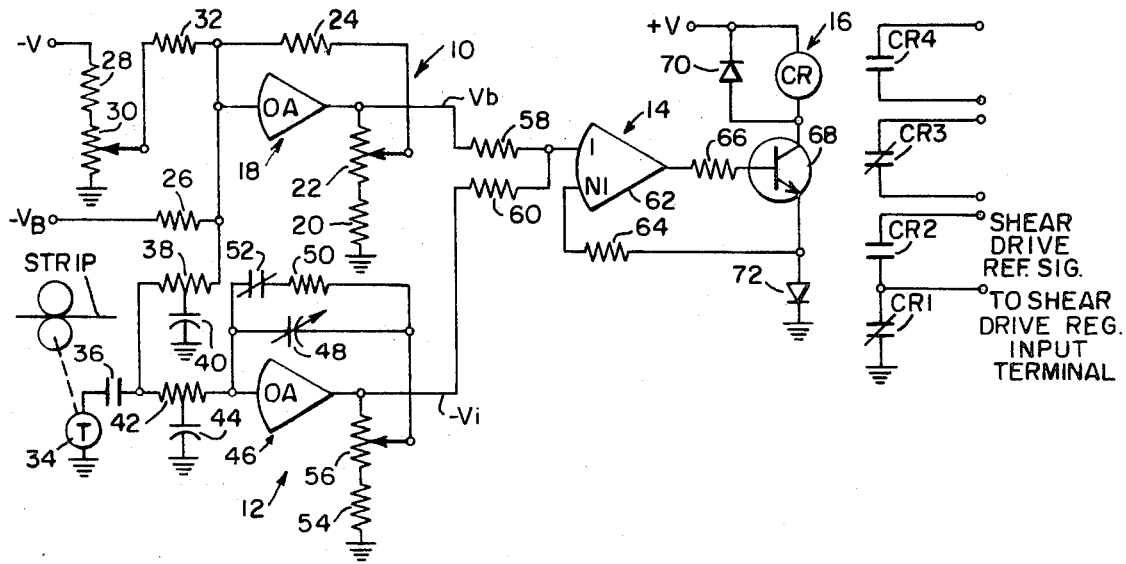
FIG. 1 is an electrical schematic showing the sensing system for cut-to-length shear in accordance with one illustrative embodiment of the invention.

Referring now to FIG. 1, the system in accordance with the invention comprises cut length measurement means indicated generally at 10, instantaneous length measuring means indicated generally at 12, voltage detection means indicated generally at 14, and shear signal means indicated generally at 16.

The cut length measurement means comprises an amplifier indicated generally at 18, the gain of which may be adjusted by means of resistor 20 and potentiometer 22, the serially connected combination being connected between the output of the amplifier and ground as shown. The wiper contact of the potentiometer 22 is connected to the input of the amplifier 18 through a resistor 24. A bias reference voltage $-V_B$, which may be in the order of $-20$ volts is connected to the input of the amplifier 18 through a resistor 26, vernier adjustment of the voltage level to the amplifier 18 may be obtained by means of resistor 28 serially connected with a potentiometer 30, the serial combination being connected between a source of negative voltage $-V$ and ground; the wiper contact of potentiometer 30 is connected to the input of the amplifier 18 through a resistor 32.

The line speed may be obtained by means of a tachometer generator 34. The voltage $V_L$ generated by the tachometer 34 is applied to the cut length measurement means 10 and the instantaneous length measuring 12 by means of a photoelectric switch (not shown) and a relay (not shown) having a normally open contact pair 36. (In the interests of simplicity, the photoswitch and relay coils are not shown—only the contacts are identified to indicate their respective switching roles.) The signal $V_L$ is applied to the measurement means 10 through a resistor-capacitor filter 38,40, and is applied to the instantaneous length measurement means 12 through a resistor-capacitor filter 42,44.

An operational amplifier indicated generally at 46 is operated as an integrator, and includes in its feedback path, a variable capacitor 48 shunted by a discharge resistor 50 connected in series with a pair of relay contacts 52. The gain of the integrator 46 may be adjusted by means of resistor 54 connected in series with a potentiometer 56, the series combination being connected between the output of the integrator and ground as indicated.

The output $V_b$ of cut length measurement means 10 is applied to the voltage detector means 14 through input resistor 58, while the intergrated output Vi of instantaneous length measuring means 12 is applied to the voltage detection means 14 through resistor 60. The voltage detection means 14 comprises an amplifier 62 having inverting (I) and non-inverting (NI) inputs, a feedback resistor 64 and an output resistor 66.

The shearing signal means 16 includes a contact relay CR having normally closed contact pairs: normally closed CR1, normally open CR2, normally closed CR3, and normally open CR4. The relay CR is connected to a source of potential +V and to the collector of a NPN transistor 68. The coil of relay CR is shunted by a protective diode 70. Completing the description, the base of transistor 68 is connected to the resistor 66 and the emitter is connected to ground through a diode 72 poled as indicated with its cathode to ground.

Figure 2:
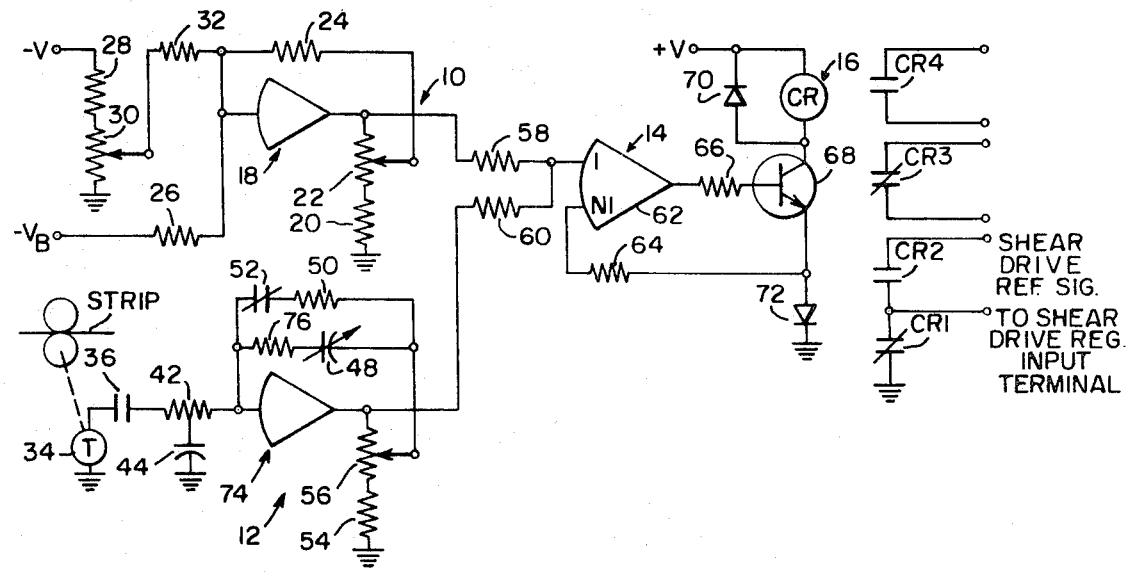
FIG. 2 is an electrical schematic showing the sensing system for cut-to-length shear in accordance with another illustrative embodiment of the invention.

The FIG. 2 embodiment is quite similar to that of FIG. 1. The line signal VL is not applied to cut length measurement means 10, but only to the instantaneous length measurement means 12. The integrator 46 is replaced by a proportional integrator 74 having a resistor 76 in series with the capacitor 48. In contemplation of this invention resistor 76 is one-tenth of the ohmic value of resistor 42.

OPERATION

Before discussing the details of the circuitry, some general considerations will prove helpful. The line speed of a moving strip of material can be readily determined. If the speed is uniform then after a known elapsed time interval, a finite length of material will have passed a given point. Obviously, if material is moving at 10 ft. per sec., in 5 seconds, 50 feet will have passed a datum point. If line speed is integrated the result is a measurement of length. The output of the integrator is a function of time, so that the longer the time interval the higher the output voltage. The integrated output voltage is therefore directly related to the length of material passing during the time interval of integration. At rated or top speed each voltage level can therefore be equated to definite lengths of material.

Considering now FIG. 3, suppose that 20 volts corresponds to 30 feet of material, i.e. steel, aluminum, etc. If the integrator builds up to voltage or 20 volts at that instant 30 feet will have passed the shearing mechanism. However, if the shearing signal is not initiated until the 20 volts level is reached then as a result of inertia and other time lags throughout the system, then, more material will have passed the shearing mechanism, and the shear will have cut too large a strip. In the practical environment of the instant invention, it has been determined that 0.3 second delay will be experienced before the shear will actually make the cut. From FIG. 3 since the time to reach 20 volts is 3 seconds at rated or top speed, if the shearing signal is initiated 0.3 second earlier, the shearing cut will take place exactly at 30 feet.

From FIG. 3 at point 78, the integrator voltage is at 18V which is the point in time when the shearing signal should be initiated. If the system is made to respond when the integrator output is 2 volts less than the target voltage, this will be satisfactory for rated or top speed (I), but it would be unsatisfactory for lower line speeds (II and III). As will be seen from FIG. 3, the shearing signal would be initiated at 80 for one-half speed (II) and at 82 for one-third speed (III) the slower the speed, the more deviant the cut length will be from the desired length. The teachings of this invention obviate this undesired result by proportional voltage adjustments.

In FIG. 3 which depicts the performance of the FIG. 1 embodiment, one tenth of the line speed voltage VL/10 is subtracted from the cut length voltage VB so that the system will initiate the shear signal at the proper time. For example if VL develops 20V at top speed, it will develop 10V at half speed and 6⅔ volts at one-third speed. Accordingly, at the following speeds the proportional voltage adjustments are:

| | VL | VL | Shear Signal Initiated Vb=Vi |
|---|---|---|---|
| Top Speed | 20 | 2 | 18 |
| Half Speed | 10 | 1 | 19 |
| One-Third Speed | 6⅔ | ⅔ | 19 ⅓ |

In the embodiment of FIG. 2, the performance of which is depicted in FIG. 4, the VL/10 adjustment is realized by using a proportional integrator 74 which provides an initial voltage output which is proportional to:

$$\frac{RESISTOR\ 76}{RESISTOR\ 42} = \frac{1}{10}.$$

Thus depending on the line speed signal $V_L$, the current through these resistors will provide a proportional voltage at time $t=0$,

| | VL | Vi at $t=o$ |
|---|---|---|
| Top Speed | 20 | 2 |
| Half Speed | 10 | 1 |
| One-Third Speed | 6⅔ | ⅔ |

Since the proportional integrator 74 starts off at a higher voltage, it reaches the bias voltage level $V_B$ earlier in time in the order of 0.3 seconds (the response time lag). Starting with 0 volts at $t=0$ it would reach $V_B$ 0.3 seconds too late, but with the proportional pedestal of 2, 1 or ⅔ volt, it is enabled to reach the level of $V_B$ 0.3 second earlier.

The circuitry will now be considered in greater detail. Referring to FIG. 1, the contacts CR1 are normally closed so the shear input terminal is at ground. Contacts CR2 which will enable the shear drive reference signal to be applied, are open. The mill operator at his console dials in a voltage $V_B$ corresponding to a desired cut length. As the leading edge of the material passes a reference point the photoswitch sends a signal which causes one relay to close contact pair 36 and another relay to open the contacts 52. Assume that the mill is operating at top speed ((I) in FIG. 3) and the $V_B$ is 20V. The integrator 46 begins to develop a voltage $-Vi$.

The line speed signal is fed to the summing amplifier with a gain 1/10, along with the bias signal $V_B$. The output $Vb$ of the summing amplifier is the difference:

$$Vb = +V_B - VL/10.$$

The output of the integrator is $-Vi$. The input to the voltage detection means 14 is therefore initially some positive voltage (since $Vb$ is larger than $Vi$ during build up). In our assumed case $VB - VL/10 = 18$ volts. $Vi$ builds up and finally equals $-18v$. As it begins to increase beyond $-18v$ the signal in to the voltage detection means 14 becomes negative. After inversion the positive signal to the base of transistor 68 turns it on, and collector-emitter current flows energizing the relay CR. When the relay is energized contacts CR1 open removing the ground, contacts CR2 close, and the shear drive reference signal is initiated. Contacts CR3 may be used in various circuits to fulfill various functions such as counters, lights to indicate the initiation of shear etc. CR4 is used to initiate a signal to deenergize relays causing contacts 52 to close, and 36 to open during the period $tc$. This discharges the capacitor 48 so that the integrator 46 may be reset. With no input signal, the voltage detector means returns to a positive output shutting off the transistor 68 deenergizing the relay CR and returning the contacts CR1, CR2, CR3, and CR4 to their state as shown in FIG. 1.

The operation of the FIG. 2 embodiment is quite similar except that the use of the proportional integrator 74 produces an initial output pedestal level. Starting then at a higher voltage level, the signal $-v_1$ builds up faster. Now $Vb=VB$, and in our illustrative case $Vi$ would build up until equated to $-20$ volts. As it increased beyond $-20v$, the system would be actuated as before.

I claim:

1. A system for providing a shear control signal for a process line of material moving at a line speed which is a function of a voltage $V_L$, said shear control signal actuating shear means for cutting predetermined lengths of material comprising
    means for deriving a voltage $V_B$ which is a function of said predetermined length;

means for deriving a voltage V$i$ which is a function of the instantaneous length of material passing through said cutting shear means;

means for deriving an additional voltage $\Delta V$ which in a function of (V$_L$ $t_{inertia}/t$) where $t_{inertia}$ is the time required for the cutting shears means to respond to said shear control signal, and $t$ is the running time required for said predetermined length to pass through the cutting shear means at maximum line speed; and means for receiving and algebraically adding said signals VB, V$i$ and $\Delta V$ as an input and for delivering said shear control signal when the algebraic relationship is satisfied: $VB = Vi + \Delta V$.

2. A system for providing a shear control signal for a process line of material moving at a line speed which is a function of a voltage V$_L$, said shear control signal actuating cutting shear means for cutting predetermined lenths of material comprising:

means for deriving a voltage V$_B$ which is a function of said predetermined length;

means for deriving said voltage V$_L$;

means for amplifying connected to algebraically sum, said voltages V$_B$, V$_L$, having a less than unity gain G numerically equal to the fraction $t_{inertia}/t$, where $t_{inertia}$ is the time required for the cutting shear means to respond to said shear control signal, and t is the running time required for said predetermined length to pass through the cutting shear means at maximum line speed, said amplifier means delivering an output V$b$ equal to V$_B$ − GV$_L$;

means for integrating, arranged for receiving said voltage V$_L$ and for delivering an integrated output V$i$; and means arranged for receiving said voltages V$b$ and V$i$ for algebraically adding said voltages and for delivering said shear control signal when $Vb = Vi$.

3. A system for providing a shear control signal for a process line of material moving at a line speed which is a function of a voltage V$_L$, said shear control signal actuating cutting shear means for cutting predetermined lengths of material comprising:

means for deriving a voltage VB which is a function of said predetermined cut length;

means for deriving said voltage V$_L$;

means for proportionally integrating, for receiving said voltage V$_L$ and for delivering an output $\Delta v + Vi$, where $\Delta v$ is the proportionality signal of said portion integrating means and is a function of (V$_L$ $t_{inertia}/t$), where $t_{inertia}$ is the time required for the cutting shears to respond to said shear cutting signal, $t$ is the running time required for said predetermined length to pass through the cutting shear means at maximum speed, and V$i$ is the integrated signal portion of said porportionally integrating means; and means for receiving and algebraically adding said signals VB and $\Delta v + Vi$, and for delivering said shear control signal when:

$$VB = Vi + \Delta V.$$

* * * * *